United States Patent
Schmid et al.

(10) Patent No.: US 6,193,794 B1
(45) Date of Patent: Feb. 27, 2001

(54) GONIOCHROMATIC LUSTER PIGMENTS BASED ON MULTIPLY COATED IRON OXIDE PLATELETS

(75) Inventors: Raimund Schmid, Neustadt; Oliver Seeger, Mannheim; Norbert Mronga, Dossenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/260,726

(22) Filed: Mar. 2, 1999

(30) Foreign Application Priority Data

Mar. 2, 1998 (DE) ................................ 198 08 657

(51) Int. Cl.$^7$ ................................ C09C 1/62; C09C 1/64
(52) U.S. Cl. .................... 106/415; 106/419; 106/420; 106/425; 106/426; 106/428; 106/430; 106/431; 106/436; 106/438; 106/439; 106/441; 106/442; 106/446; 106/450; 106/456; 106/457; 106/459; 106/481; 106/482; 106/483; 428/403; 428/404; 427/215; 427/218; 427/219
(58) Field of Search .................... 106/415, 419, 106/420, 425, 426, 428, 430, 431, 436, 438, 439, 441, 442, 446, 450, 456, 457, 459, 481, 482, 483; 428/403, 404; 427/215, 218, 219

(56) References Cited

U.S. PATENT DOCUMENTS

| | | | |
|---|---|---|---|
| 3,438,796 | 4/1969 | Hanke | 106/415 |
| 3,869,298 | 3/1975 | Suzuki et al. | 106/415 |
| 4,404,254 | 9/1983 | Franz et al. | 428/329 |
| 4,826,537 | 5/1989 | Ostertag | 106/415 |
| 5,135,812 | 8/1992 | Phillips et al. | 428/403 |
| 5,607,504 | 3/1997 | Schmid et al. | 106/403 |
| 5,624,486 | 4/1997 | Schmidt et al. | 106/415 |
| 5,626,661 | * 5/1997 | Schmid et al. | 106/415 |
| 5,733,364 | * 3/1998 | Schmid et al. | 106/403 |
| 5,766,335 | * 6/1998 | Bujard et al. | 106/404 |
| 5,958,125 | * 9/1999 | Schmid et al. | 106/415 |

FOREIGN PATENT DOCUMENTS

| | | |
|---|---|---|
| 2180669 | 1/1997 | (CA) . |
| 196 18 569 | 11/1997 | (DE) . |
| 0 014 382 | 8/1980 | (EP) . |
| 0 068311 | 1/1983 | (EP) . |
| 0 265 820 | 5/1988 | (EP) . |
| 0 668 329 | 8/1995 | (EP) . |
| 0 708 154 | 4/1996 | (EP) . |
| 0 753 545 | 1/1997 | (EP) . |
| WO 96/34917 | 11/1996 | (WO) . |

* cited by examiner

*Primary Examiner*—Anthony Green
(74) *Attorney, Agent, or Firm*—Oblon, Spivak, McClelland, Maier & Neustadt P.C.

(57) ABSTRACT

The iron oxide platelets comprise at least one layer packet comprising
  A) a colorless coating having a refractive index $n \leq 1.8$, and
  B) a colorless coating having a refractive index $n \geq 2.0$.

11 Claims, No Drawings

GONIOCHROMATIC LUSTER PIGMENTS BASED ON MULTIPLY COATED IRON OXIDE PLATELETS

The present invention relates to novel goniochromatic luster pigments based on multiply coated iron oxide platelets comprising at least one layer packet comprising A) a colorless coating having a refractive index $n \leq 1.8$, and B) a colorless coating having a refractive index $n \geq 2.0$.

This invention further relates to the production of these luster pigments and to their use for coloring coatings, inks, including printing inks, plastics, glasses, ceramic products and decorative cosmetic preparations.

Luster effect pigments are used in many sectors of industry, for example in automotive coatings, decorative coating, plastics pigmentation, paints, printing inks, especially security printing inks, and cosmetics.

Their optical effect is based on the directed reflection of light at predominantly sheetlike, mutually parallel-oriented, metallic or strongly refractive pigment particles. Depending on the composition of the pigment platelets, interference, reflection and absorption phenomena create angle-dependent color and lightness effects.

Owing to their uncopiable optical effects, these pigments are increasingly gaining in importance for the production of forgeryproof security documents, such as banknotes, checks, check cards, credit cards, tax stamps, postage stamps, rail and air tickets, telephone cards, lottery tickets, gift vouchers, passes and identity cards.

Markings prepared with the luster effect pigments and the absence of these markings or their alteration, for example in a color copy (disappearance of color flops and luster effects), are reliably discernible by the unaided, naked eye and so make it easy to distinguish the copy from the original.

Particular interest pertains to goniochromatic luster pigments which exhibit an angle-dependent color change between two or more intensive interference colors and hence an attractive color play.

The prior art discloses a number of metallic-based goniochromatic luster pigments, which are produced via physical vapor deposition techniques (U.S. Pat. Nos. 3,438,796 and 5,135,812) or by coating of metal platelets by means of gas phase decomposition of volatile precursors (CVD=Chemical Vapor Deposition) or by wet-chemical coating of the metal platelets (EP-A-668 329, EP-A-708 154 and WO-A-96/34917).

Goniochromatic luster pigments based on transparent, silicatic substrates or coated iron(III) oxide platelets are described in DE-A-196 18 569 and EP-A-753 545, respectively.

Prior art luster pigments differ from the pigments of the present invention in the type of substrate material and/or of the applied coatings.

It is an object of the present invention to provide further goniochromatic luster pigments having advantageous application properties.

We have found that this object is achieved by the goniochromatic luster pigments defined at the beginning.

The present invention further provides a process for producing these luster pigments, which comprises applying said coatings (A) and (B) to said iron oxide platelets independently of each other either wet-chemically by hydrolytic decomposition of organic or inorganic metal compounds or by gas phase decomposition of volatile, organic or inorganic metal compounds.

The present invention further provides a process for producing inventive luster pigments based on magnetite platelets, which comprises a) coating iron(III) oxide platelets initially with said coatings (A) and (B) and subsequently treating the coated platelets with hydrogen at from 150 to 600° C., or b) initially treating said iron(III) oxide platelets with a reducing gas at from 150 to 600° C. and subsequently coating the magnetite platelets obtained with said coatings (A) and (B).

The present invention finally provides for the use of the luster pigments of this invention for coloring coatings, inks, including printing inks, plastics, glasses, ceramic products and decorative cosmetic preparations.

The goniochromatic luster pigments of the present invention are based on multiply coated iron oxide platelets.

Examples of preferred substrate materials are platelet-shaped α-iron(III) oxide (α-$Fe_2O_3$, hematite), which may be doped with silicon (EP-A-14 382), aluminum (EP-A-68 311) or aluminum and manganese (EP-A-265 820), and platelet-shaped iron(II/III) oxide ($Fe_3O_4$, magnetite), which may likewise be doped with the metals mentioned.

The iron oxide platelets of the present invention are highly refractive. Their refractive index n is generally $\geq 2.0$, preferably $\geq 2.4$. The doped or undoped iron(III) oxide platelets are essentially transparent to virtually nontransparent for visible light depending on the contemplated wavelength, whereas the magnetite platelets are essentially opaque.

The size of the iron oxide platelets is not critical per se and can be adapted to the particular application intended. In general, the platelets have mean largest diameters from about 1 to 50 μm, preferably from 5 to 20 μm. The thickness of the platelets is generally within the range from 0.1 to 1 μm, preferably around about 0.3 μm. Their specific free surface area (BET) is customarily within the range from 0.5 to 15 $m^2/g$, especially within the range from 1 to 12 $m^2/g$.

The luster pigments of the present invention combine a colorless low refractive coating (A) with a colorless high refractive coating (B). They may comprise a plurality of identical or different combinations (layer packets) of (A)+(B), but coating with just one layer packet (A)+(B) is preferred.

The colorless low refractive coating (A) has a refractive index $n \leq 1.8$, preferably $\leq 1.6$, and an absorption constant $k=0$ in the visible wavelength range.

The layer material (A) is suitably any low refractive colorless substance which can be applied to the iron oxide platelets in the form of a durable film, inorganic materials being preferred.

Particularly suitable materials include for example metal oxides and metal oxide hydrates such as silicon oxide, silicon oxide hydrate, aluminum oxide, aluminum oxide hydrate and mixtures thereof, preference being given to silicon oxide (hydrate).

The geometric layer thickness of the coating (A) is generally within the range from 50 to 800 nm, preferably within the range from 100 to 600 nm. Since the layer (A) essentially determines the interference colors of the pigments of the present invention, it has a minimum layer thickness of about 200 nm for luster pigments which have just one layer packet (A)+(B) and which exhibit a particularly pronounced color play and hence are also preferred. If a plurality (e.g., 2, 3 or 4) of layer packets (A)+(B) are present, the layer thickness of (A) is preferably within the range from 50 to 200 nm.

As the layer thickness of (A) increases, the dry pigment powder is observed in plan view to pass repeatedly in succession through the interference colors of blue-greengold-red-violet, the angle dependence of the hue increasing starting with the second order blue. However, the interference colors are visible only in the dry state and disappear completely in the moist state or in varnish. The additional coating with (B) renders the optically variable layer visible in varnishes, too.

The colorless high refractive coating (B) has a refractive index $n \geq 2.0$, especially $\geq 2.4$, and an absorption constant $k=0$ in the visible wavelength range.

The layer material (B) is suitably any high refractive colorless substance which can be applied to the (A)-coated iron oxide platelets in the form of a durable film.

Particularly suitable layer materials (B) include not only metal sulfides such as zinc sulfide but especially metal oxides and metal oxide hydrates, for example titanium dioxide, titanium oxide hydrate, zirconium dioxide, zirconium oxide hydrate, tin dioxide, tin oxide hydrate, zinc oxide, zinc oxide hydrate and mixtures thereof, preference being given to titanium dioxide and titanium oxide hydrate and their mixtures with up to about 5% by weight of the other metal oxides, especially tin dioxide. Titanium dioxide can also be used together with low refractive colorless metal oxides if the refractive index of these mixtures is $\geq 2.0$.

The coating (B) preferably has a smaller layer thickness than the coating (A). Preferred geometric layer thicknesses for coating (B) range from about 5 to 50 nm, especially from 10 to 40 nm.

The coating (B) which is preferred according to the present invention consists essentially of titanium dioxide and preferably has an optical layer thickness of $\leq 100$ nm, i.e., is silvery by itself and does not exhibit any interference effects.

The luster pigments of the present invention are notable for high hiding power, high lightness values, strong and extremely angle-dependent interference colors and "silkily soft esthetics" in applied form and also for the uniform, homogeneous and filmlike construction of their interference-capable coating. Luster pigments of the present invention which are based on iron(III) oxide platelets produce particularly strong red and gold shades, while strong blue and green shades are obtainable on the basis of magnetite platelets especially.

In the process of the present invention for producing the luster pigments, the coatings (A) and (B) are applied independently of each other either wet-chemically by hydrolytic decomposition of organic or inorganic metal salts or by gas phase decomposition (CVD) of suitable volatile metal compounds.

It will be appreciated that the two approaches may be arbitrarily combined to produce the individual layers. When both the coatings are applied wet-chemically there is no need for the (A)-coated iron oxide platelets to undergo intermediary drying; if the same reaction medium is used, intermediary isolation may likewise be dispensed with. Accordingly, intermediary isolation is customarily not necessary either when both the coating steps are carried out according to the CVD process.

The wet-chemical production route and the CVD production route are equally suitable for preparing the silicon and/or aluminum oxide (hydrate) layers (A).

The wet-chemical variant may advantageously be conducted in accordance with the process described in EP-A-668 329, which comprises hydrolyzing organic silicon and/or aluminum compounds in which the organic radicals are attached to the metals via oxygen atoms in the presence of the iron oxide platelets and of an organic solvent in which the metal compounds are soluble and which is miscible with water.

The preferred embodiment comprises hydrolyzing the metal alkoxides (especially tetraethoxysilane and aluminum triisopropoxide) in the presence of an alcohol (especially isopropanol) and of aqueous ammonia as catalyst.

The process described in EP-A-668 329 is preferably carried out by providing iron oxide platelets, isopropanol, water and ammonia as initial charge, heating this mixture to 40–80° C., especially 60–70° C., with stirring, and continuously adding a solution of the metal alkoxide in isopropanol by metering. Following a post-addition stirring time of usually from about 1 to 15 h, the mixture is cooled down to room temperature, and the coated pigment is isolated by filtration and drying.

Silicon oxide hydrate coatings (A) may advantageously also be produced from alkali metal silicates, especially sodium silicate.

An advantageous procedure is to suspend the iron oxide platelets in water, heat the suspension to about 20–100° C., preferably 40–80° C., using a base (especially an alkali metal hydroxide solution such as potassium hydroxide solution or sodium hydroxide solution) or an acid (nitric acid, for example) to set a pH of generally 4–9, preferably 6.5–8.5, especially about 7.5, and meter in the alkali metal silicate solution while at the same time adding an aqueous inorganic acid such as hydrochloric acid, especially dilute hydrochloric acid, to keep the pH constant. If necessary, the batch is subsequently stirred for a period ranging from a few min up to 2 h.

The CVD variant may be carried out according to the process described in EP-A-708 154. Silanes containing at least one alkanoyloxy radical are decomposed in the gas phase using water vapor and, if the silanes also contain alkyl or phenyl radicals, oxygen in the presence of the fluidized iron oxide platelets.

Preferred silanes have alkoxy and alkanoyloxy radicals, and particular preference is given to di-tert-butoxydiacetoxysilane.

To carry out the CVD variant it is advisable to employ (as generally customary for CVD processes) a fluidized bed reactor. The iron oxide platelets are fluidized in the reactor with an inert gas such as nitrogen while being heated to the desired reaction temperature (generally 100–600° C., preferably 150–300° C.), and then silane and water vapor (and also, if appropriate, oxygen) are then introduced via separate nozzles from upstream vaporizer vessels with the aid of inert carrier gas streams (advantageously bleed streams of the fluidizing gas), the silane concentration being advantageously maintained at $\leq 5\%$ by volume, preferably $\leq 2\%$ by volume, based on the total amount of gas in the reactor. The amount of water vapor should be not less than the amount stoichiometrically required to hydrolyze the silane, but from 10 to 100 times that amount is preferable.

Similarly, the coatings (B) may be deposited both by the CVD route and by the wet-chemical route.

Suitable starting compounds for the CVD variant include especially metal alkoxides, metal halides and organometals. Preference is given to compounds which have a sufficiently high vapor pressure at temperatures below 200° C. to ensure simple vaporization, ideally without decomposition.

Suitable alkoxides include aromatic alkoxides such as phenoxides and benzyl alkoxides and also aliphatic, especially $C_1$–$C_4$, alkoxides such as n-, iso- and tert-butoxides, preferably methoxides and ethoxides and especially n- and iso-propoxides and also mixtures thereof.

The metal halides are preferably chlorides.

Organometals may be for example metal alkyls, especially those having up to 4 carbon atoms in the alkyl chain, metal alkenyls, metal aryls, metal arylalkyls and metal alkylalkenyls.

Examples of suitable starting compounds are:

alkoxides such as titanium tetraethoxide, titanium tetra-n-propoxide and titanium tetraisopropoxide and especially mixtures of titanium tetraethoxide and titanium tetraisopropoxide, preferably in a molar ratio of about 1:1, which are notable for low vaporization temperatures (around 120° C.) and also low decomposition temperatures (hydrolysis with water vapor possible at about 200° C.), and also zirconium n- and isopropoxide;

halides such as titanium tetrachloride, zirconium tetrachloride and tin tetrachloride;

organics such as tin tetramethyl, tin tetra-n-butyl and zinc diethyl.

The decomposition of these metal compounds to form metal oxide layers which form filmlike deposits on the (A)-coated iron oxide platelets is advantageously likewise effected in a fluidized bed reactor, using water vapor in the case of the alkoxides and halides and oxygen as additional reaction gas in the case of the organics. Suitable decomposition temperatures range generally from 100 to 600° C., preferably from 150 to 300° C. (alkoxides), from 150 to 350° C. (halides) and from 300 to 500° C. (organics).

Similarly to the metal oxide (hydrate) coatings (A), the metal oxide (hydrate) layers (B) may likewise be applied wet-chemically by hydrolysis of metal alkoxides (titanium ethoxide, for example) in an alcoholic medium or preferably by hydrolysis of inorganic metal salts, especially halides, preferably chlorides, in aqueous suspension.

In an advantageous embodiment for depositing the preferred titanium dioxide layers (B), an aqueous suspension of the (A)-coated iron oxide platelets is heated to customarily 50–100° C., preferably 70–80° C., adjusted to a pH which is generally within the range from 0.5 to 5, preferably within the range from 1.5 to 2.5, especially about 2.2, with a base (especially an alkali metal hydroxide solution such as potassium hydroxide solution or sodium hydroxide solution) or an acid, and a titanium tetrachloride solution is metered in at the same time as a base is added to keep the pH constant.

The deposited titanium oxide (hydrate), whether deposited from the gas phase or wet-chemically, is only incompletely crystalline. The amorphous portions can be converted into a crystalline form, customarily into the anatase form, by calcining the isolated (and dried) pigment. For this, the pigment is generally heated to 400–1000° C. for about 1–4 h. If the titanium dioxide coating (B) is to be in the rutile form after calcination, it is advisable to dope the titanium oxide (hydrate) with about 0.5–10% by weight of tin dioxide by simultaneous deposition of tin oxide (hydrate) to favor the formation of the rutile form.

The inventive luster pigments which are based on magnetite platelets may advantageously be produced by subsequent reduction of (A)- and (B)-coated iron(III) oxide platelets with hydrogen (variant a) of the similarly inventive production process).

Suitable reduction temperatures for this customarily range from 150 to 600° C., especially from 200 to 500° C.

The magnetite-based luster pigments may also be produced by initially reducing iron(III) oxide platelets and then coating the resulting magnetite platelets with (A) and (B) (variant b) of the inventive production process).

The reduction of the iron(III) oxide platelets is preferably effected with reducing gases such as hydrogen, and reduction temperatures from 150 to 600° C., especially from 200 to 500° C., are advantageous. At temperatures $\geqq 600°$ C., the magnetite platelets formed contain increasing proportions of metallic iron. The enhanced magnetizability of these pigments may be deliberately exploited as a further security feature.

The reduction in both process variants is advantageously carried out in an inertizable oven in which thorough mixing of the substrate particles is possible. An example of a suitable oven on the laboratory scale is a rotary sphere oven, i.e., a single-neck round-bottom flask which is made of quartz glass, is rotated by a motor, is provided with gas feed and discharge lines in the axis of rotation and is heated by a clamshell oven, and an example of a suitable oven for a continuous process on an industrial scale is a rotary tube oven having internals for pigment mixing and gas feed and discharge lines.

The production processes of the present invention make it possible to produce the multiply coated luster pigments reproducibly in a simple manner in large volumes. The pigment particles obtained are completely enrobed and the individual coatings are of high quality (homogeneous, filmlike).

The luster pigments of the present invention are very useful for many purposes, such as coloring plastics, glasses, ceramic products, decorative cosmetic preparations and especially coatings and inks, including printing inks, including security printing inks. All industrially customary printing processes are suitable, for example screen printing, intaglio printing, bronze printing, flexographic printing and offset printing.

For these applications, the pigments of the present invention are also advantageously usable in admixture with transparent and hiding white, color and black pigments and also conventional luster pigments based on metal oxide-coated mica and metal pigments and known goniochromatic luster pigments.

EXAMPLES

Production and use of luster pigments according to the invention

To evaluate the coloristics of the pigment obtained, in each case 0.4 g of the pigment was stirred into 3.6 g of a polyester mixing varnish having a solids content of 21% by weight and dispersed in a Red Devil® for 2 min. A draw bar (wet film thickness (200 $\mu$m) was then used to prepare single-stroke drawdowns of the pigmented varnishes on a piece of black and white cardboard. After the film had dried, the CIELAB values were measured with a Multiflash goniospectrophotometer from Optronik at an angle difference of from 20° to 115° to the specular angle against a black background. The reported color coordinates relate to the standard illuminant D65. L is the lightness, a* is the red/green content and b* is the blue/yellow content. H is the hue angle and C is chroma. This measuring set-up will capture only part of the color play, namely essentially the color of the coating in plan view.

Example 1 a) In a 1.5 m$^3$ capacity stirred tank, 20 kg of a copper-colored, aluminum- and manganese-doped, platelet-shaped iron(III) oxide pigment (mean particle diameter 18 $\mu$m; Paliocrom® Kupfer L3000, BASF) were heated to 60° C. in a mixture of 305 l of isopropanol, 80 kg of water and 8 kg of 25% strength by weight aqueous ammonia solution with stirring. A mixture of 125 kg of tetraethoxysilane and 125 kg of isopropanol on the one hand and at the same time 28.1 kg of 3% strength by weight aqueous ammonia solution were then metered in. The progress of the coating was monitored by regular sampling. After a post-addition stirring time of 2 h and cooling down of the suspension, the product was filtered off, washed with water and dried at 80° C. under reduced pressure.

The dried $SiO_2$-coated pigment exhibited in air an orange interference color in plan view, which flopped toward gold in slant view.

b) 1 kg of the $SiO_2$-coated and dried product were heated to 200° C. in a fluidized bed reactor while being fluidized with a total of 1800 l/h of nitrogen. A portion of the fluidizing gases (400 l/h) was then passed through a water reservoir temperature controlled to 50° C., while another portion of the fluidizing gases (400 l/h) was passed through a reservoir, temperature controlled to 120° C., containing a mixture of titanium tetraethoxide and titanium tetraisopropoxide (molar ratio 1:1, Titanat IPET, from Hüls). In this way, 150 ml of the titanium alkoxide mixture were transferred into the fluidized bed reactor a little at a time in the course of about 8 h and converted into $TiO_2$ which deposits on the pigment platelets.

The obtained had a silicon content of 26.5% by weight and a titanium content of 2.1% by weight. Examination under an electron microscope (TEM section) revealed a geometric $SiO_2$ layer thickness of about 400 nm and a geometric $TiO_2$ layer thickness of about 35 nm. Applied in varnish, the pigment exhibited an angle-dependent color play from bluish red to gold at a high lightness level. Colorimetric data of pigment obtained:

| Measuring angle in ° | L | a* | b* | C | H |
|---|---|---|---|---|---|
| 20 | 78.99 | 51.87 | −6.64 | 52.29 | 352.7 |
| 25 | 67.98 | 47.39 | −3.21 | 47.5 | 356.1 |
| 35 | 50.27 | 37.83 | 4.17 | 38.06 | 6.29 |
| 45 | 38.74 | 31.14 | 9.93 | 32.69 | 17.69 |
| 55 | 31.62 | 27.58 | 13.63 | 30.77 | 26.3 |
| 65 | 26.11 | 25.26 | 16.2 | 30.01 | 32.68 |
| 75 | 24.98 | 24.9 | 16.53 | 29.89 | 33.58 |
| 115 | 21.99 | 25.1 | 18.66 | 31.27 | 36.62 |

Example 2

1 kg of the $SiO_2$-coated and dried product of Example 1a) were coated with $TiO_2$ in a fluidized bed reactor similarly to Example 1b) by using 300 ml of the titanium alkoxide mixture.

The pigment obtained had a silicon content of 24.2% by weight and a titanium content of 5.7% by weight. Examination under an electron microscope (TEM section) revealed a geometric $SiO_2$ layer thickness of about 400 nm and a geometric $TiO_2$ layer thickness of about 75 nm. Applied in varnish, the pigment exhibited an angle-dependent color play from pale blue via intense violet to gold at a high lightness level.
Colorimetric data of pigment obtained:

| Measuring angle in ° | L | a* | b* | C | H |
|---|---|---|---|---|---|
| 20 | 80.39 | 43.8 | −19.43 | 47.92 | 336.08 |
| 25 | 69.86 | 37.43 | −13.35 | 39.74 | 340.36 |
| 35 | 53.05 | 27.15 | −1.35 | 27.18 | 357.16 |
| 45 | 42.17 | 22.32 | 6.71 | 23.3 | 16.7 |
| 55 | 35.49 | 20.76 | 11.05 | 23.52 | 28.02 |
| 65 | 30.16 | 20.15 | 13.27 | 24.13 | 33.35 |
| 75 | 29.05 | 19.98 | 13.47 | 24.1 | 33.99 |
| 115 | 26.09 | 19.74 | 14.29 | 24.37 | 35.9 |

Example 3

In a rotary sphere oven, 75 g of the pigment of Example 2 were inertized by passing 10 l/h of nitrogen over the pigment for 30 minutes and at the same time heated to 350° C. 5 l/h of hydrogen were then mixed into the inert gas stream. After 10 min the temperature was raised to 400° C. The hydrogen content was then increased to 10 l/h and the nitrogen content reduced to 5 l/h. After 1 h, 15 l/h of hydrogen (without nitrogen stream) were finally passed over the pigment. After about 5 h, the hydrogen stream was switched off and the pigment was cooled down to room temperature under a nitrogen stream of 15 l/h.

The reduced pigment had a silicon content of 24.8% by weight, a titanium content of 5.9% by weight and an iron(II) content of 11.2% by weight (total iron 22.1% by weight). Applied in varnish, the pigment exhibited a powerful angle-dependent color play from blue to violet.
Colorimetric data of pigment obtained:

| Measuring angle in ° | L | a* | b* | C | H |
|---|---|---|---|---|---|
| 20 | 81.44 | 42.69 | −18.61 | 46.57 | −23.56 |
| 25 | 71.86 | 36.39 | −13.5 | 38.82 | −20.35 |
| 35 | 55.37 | 26.38 | −2.59 | 26.5 | −5.6 |
| 45 | 44.06 | 21.67 | 5.36 | 22.32 | 13.89 |
| 55 | 36.82 | 20.35 | 10.11 | 22.72 | 26.41 |
| 65 | 30.88 | 20.14 | 12.97 | 23.95 | 32.77 |
| 75 | 29.77 | 19.98 | 13.29 | 24 | 33.64 |
| 115 | 26.4 | 20.14 | 14.33 | 24.72 | 35.44 |

We claim:

1. Goniochromatic luster pigments based on multiply coated iron oxide platelets comprising at least one layer packet comprising A) a colorless coating having a refractive index $n \leq 1.8$, and B) a colorless coating having a refractive index $n \geq 2.0$ adjacent to (A).

2. Luster pigments as claimed in claim 1, wherein said iron oxide platelets consist essentially of α-iron(III) oxide or magnetite, which each may be doped with silicon, aluminum and/or manganese.

3. Luster pigments as claimed in claim 1, wherein said iron oxide platelets have mean largest diameters of $\leq 50\,\mu m$.

4. Luster pigments as claimed in claim 1, wherein said coating (B) has an optical layer thickness of $\leq 100$ nm.

5. Luster pigments as claimed in claim 1, wherein said coating (A) consists essentially of silicon oxide, silicon oxide hydrate, aluminum oxide and/or aluminum oxide hydrate.

6. Luster pigments as claimed in claim 1, wherein said coating (B) consists essentially of titanium dioxide, titanium oxide hydrate, zirconium dioxide, zirconium oxide hydrate, tin dioxide, tin oxide hydrate, zinc oxide, zinc oxide hydrate and/or zinc sulfide.

7. Luster pigments as claimed in claim 1, comprising just one layer packet (A)+(B).

8. A process for producing goniochromatic luster pigments based on multiply coated iron oxide platelets comprising at least one layer packet comprising:
   A) a colorless coating having a refractive index $n \leq 1.8$; and
   B) a colorless coating having a refractive index $n \geq 2.0$ adjacent to (A), which comprises applying said coatings (A) and (B) to said iron oxide platelets independently of each other either wet-chemically by hydrolytic decomposition of organic or inorganic metal compounds or by gas phase decomposition of volatile, organic or inorganic metal compounds.

9. A process for producing goniochromatic luster pigments based on multiply coated magnetite platelets comprising at least one layer packet comprising:
   A) a colorless coating having a refractive index $n \leq 1.8$; and
   B) a colorless coating having a refractive index $n \geq 2.0$ adjacent to (A), which comprises
      a) coating iron (III) oxide platelets initially with said coatings (A) and (B) and subsequently treating the coated platelets with hydrogen at from 150 to 600° C., or
      b) initially treating said iron (III) oxide platelets with a reducing gas at from 150 to 600° C. and subsequently coating the magnetite platelets obtained with said coatings (A) and (B).

10. A method of coloring coatings, inks, plastics, glasses, ceramic products and decorative cosmetic preparations, which comprises incorporating the luster pigments of claim 1 into coatings, inks, plastics, glasses, ceramic products and decorative cosmetic preparations.

11. The method of claim 10, wherein said ink is a printing ink.

* * * * *